A. MENDELSON.
DEVICE FOR PICKING UP AND DROPPING LUMP SUGAR AND CANDY.
APPLICATION FILED OCT. 12, 1914.
1,219,474.
Patented Mar. 20, 1917.
2 SHEETS—SHEET 2.
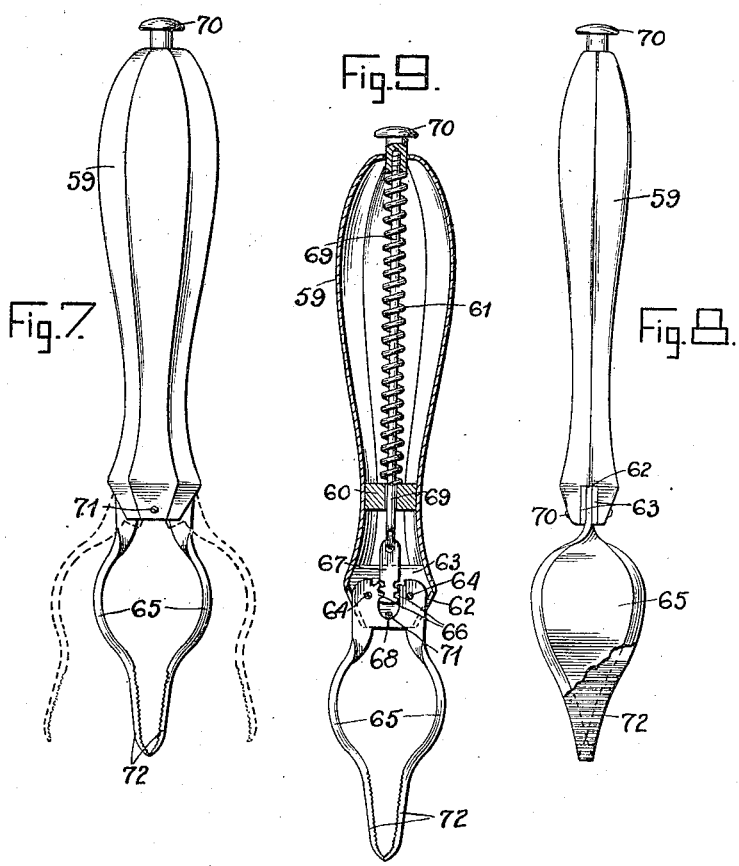
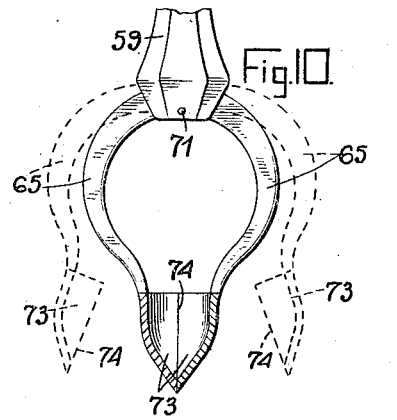
WITNESSES
INVENTOR
Aaron Mendelson
BY
ATTORNEYS

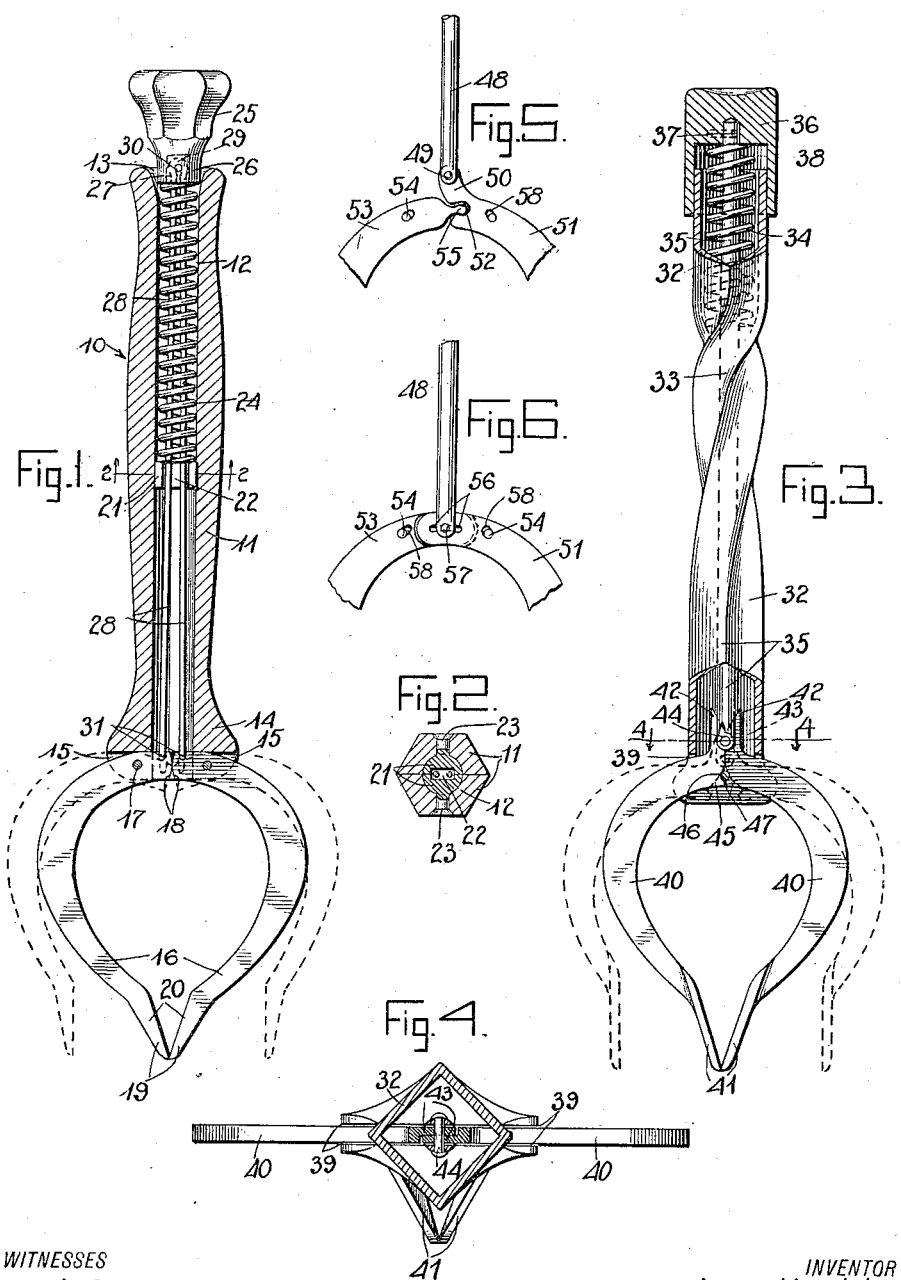

UNITED STATES PATENT OFFICE.

AARON MENDELSON, OF BROOKLYN, NEW YORK.

DEVICE FOR PICKING UP AND DROPPING LUMP-SUGAR AND CANDY.

1,219,474.

Specification of Letters Patent.   Patented Mar. 20, 1917.

Application filed October 12, 1914.  Serial No. 866,274.

*To all whom it may concern:*

Be it known that I, AARON MENDELSON, a citizen of the United States, and a resident of the city of New York, borough of Brooklyn, in the county of Kings and State of New York, have invented a new and Improved Device for Picking Up and Dropping Lump-Sugar and Candy, of which the following is a full, clear, and exact description.

This invention relates to an improved device for picking up and dropping lump sugar and candy or the like and the object of the invention is to provide a conveniently operable device of the nature described which takes the form of a clasp or pair of tweezers capable of operation by one hand.

A further object of the invention is to provide a device for picking up lump sugar or candy and the like which includes a hollow handle having a pair of pivoted jaws at its lower end with novel operating means connected thereto and normally held by a spring in such position to move the jaws together and tending to normally hold or clamp the sugar or candy so that it is unnecessary to exert pressure thereon by the hand to hold the sugar or the like, while at the same time the device may be readily manipulated to move the jaws apart for releasing the material held therebetween, and the device being such as to permit it to be readily wedged into a bowl or box containing sugar or candy without interference or binding obstruction as would be the case in the use of ordinary tongs or ice-pick-like devices.

With the above and other objects in view, the invention resides in the peculiar combination and arrangement of parts to be hereinafter more fully described, illustrated and claimed, it being also an object to provide a device which is simple in construction, durable and efficient.

Reference is to be had to the accompanying drawings forming a part of this specification, in which similar characters of reference indicate corresponding parts in all the views and in which—

Figure 1 is a vertical sectional view of one form of the invention illustrating one operating means and showing the clamping jaws in open and closed positions;

Fig. 2 is a cross sectional view taken on the line 2—2 of Fig. 1;

Fig. 3 is an elevation partly in section of a modified structure;

Fig. 4 is a cross sectional view taken on the line 4—4 of Fig. 3;

Fig. 5 is a fragmentary elevation showing a modified form of connection of the operating member with the clamping jaw;

Fig. 6 is a similar view of a further modification;

Fig. 7 is a front elevation of another form of the invention;

Fig. 8 is an edge elevation thereof;

Fig. 9 is a sectional view thereof similar to Fig. 1;

Fig. 10 is a detail view showing the jaws provided to pick up granulated or powdered sugar and the like.

In the form of the invention illustrated in Figs. 1 and 2 of the drawings the improved device is shown as comprising a handle 10 made up of two sections 11 of any preferred contour but which in the present instance are illustrated as forming a hexagonal member in cross section when the sections are fitted together. These sections are interiorly hollowed out or grooved to form a hollow or tubular handle the bore of which is indicated by the numeral 12. As shown, this bore is of uniform diameter substantially throughout the length of the handles with the exception of the upper portion thereof which is enlarged as shown at 13. The lower extremities of the sections are flattened and widened out as shown at 14 and the exposed faces of the sections at said ends are provided with opposed recesses 15 opening at the lower end of the handle to provide a slot into which the exposed grooves in the handle sections extend, so that the bore extends to the extremities of the portions 14.

Pivoted in the opposed enlargements 14 to operate in the slots 15 are a pair of clamping jaws 16, these jaws being mounted on transverse pivots 17 at points spaced from their upper ends which are preferably made convexly arcuate, as shown at 18, so as to rock on one another when the jaws swing in arcs of which the pivots are centers. The jaws, as illustrated, curve outwardly and then inwardly toward each other and are tapered at their clamping ends as shown at 19, while their clamping edges or faces are made rectilinear, as shown at 20 to more positively grasp a lump of sugar, piece of candy or like material. Mounted in the sections 11 of the handle is a split bearing composed of semicircular sections 21, the same having coacting recesses producing an opening 22 of a size somewhat restricted relative to the diameter of the bore of the handle. These sections are secured in position as by riveted extensions 23 or otherwise and the split bearing thus produces a stop or shoulder substantially intermediate the length of the handle to form a seat for a retractile coiled spring 24 seated in the bore of the handle and limited in its displacement toward the end of the handle to which the jaws are pivoted by the bearing.

An operating head 25 is provided, the same having a reduced neck portion or extension 26 to operate in the bore of the handle at the upper end thereof and having connection with the jaws for opening the latter to grasp or release a lump of sugar or the like. For this purpose the neck portion 26 is provided with a counterbore or recess 27 in its lower end and a connection or plunger 28 comprising a section of wire of the proper strength is rebent as shown at 29 and passed into this counterbore, after which it is secured in position by passing a pin 30 through the neck portion and bight portion thus formed by bending the wire producing the connection of the operating head with the clamping jaws and subsequently soldering the same if desired. The leg portions of the connection forming the plunger are passed through the coiled spring and opening 22 of the split bearing and at their extremities are bent at right angles, or substantially so as shown at 31, for engagement with apertures in the extremities of the clamping jaws inwardly of the pivots 17, and near the upper edges of the upper ends of the jaws so as to create a leverage requiring but slight depression of the operating head in order to swing the clamping jaws on their pivots to an open position. It is also obvious that the spring being limited in its downward movement by the stop member or split bearing would exert upward pressure against the operating head to correspondingly shift the connection or plunger and thus normally tend to hold the engaging ends of the clamping jaws together or normally in clamping position so that while it is necessary to depress the operating head to open the jaws for engaging or releasing the sugar or the like, it is not necessary to exert pressure by the hand in order to retain the material between the jaws, so that considerable convenience is provided for in picking up and releasing the sugar or the like and this without handling the same so as to provide for extreme sanitary conditions. The pivots 17 are provided in the form of rivets which, with any other suitable means as may be provided, serve to hold the sections forming the handle together.

In the form of the invention illustrated in Figs. 3 and 4 of the drawings the handle indicated by the numeral 32 is made up of a tube of rectangular cross section twisted as shown at 33 to reduce the interior bore thereof to form a seat for a retractile coiled spring 34 which is positioned in the upper end of the handle. A plunger or connecting rod 35 extends through the handle and spring and at its upper end is connected to an operating head 36 as by means of a transverse connecting pin 37, this operating head preferably having a counterbore in its under side, as shown at 38, to slide over the upper end of the handle while the spring is held from displacement between the interior seat or stop formed by twisting the handle or otherwise and the under wall of the counterbore in the operating head so that the spring normally tends to exert upward pressure against the operating head to raise the same. The lower end of the handle is provided with opposed recesses and slots 39 in two diagonally opposite corners thereof which serve to provide for the reception of a pair of pivoted jaws 40 which are similar to the jaws heretofore described except that they are provided with wide clamping faces 41 by bending the material forming the jaws at right angles or substantially so, at their free extremities and thus presenting larger surfaces for contact with the lumps of sugar or candy to be grasped therebetween. The upper and inner extremities of the jaws are beveled in opposite directions, as shown at 42, and are of reduced width relative to the width of the bore of the tube or handle so as to allow room for movement thereof within the handle. The inner edges of these portions of the jaws are formed with circular apertured ears 43 which are made one-half as thick as the material of which the jaws are formed so as to interfit, as shown in Fig. 4 of the drawings, and permit the jaws to move in alinement upon a pivot 44 pivotally connecting the jaws through their apertured ears. From the point of pivotal connection of the jaws the coacting edges thereof are brought in contact and then diverge outwardly, as shown at 45, in such a manner as to straddle a pin 46 passed through the handle at its lower end in a plane parallel to the pivot and through the corner portions at right angles to the slots 39. These edges are brought together beyond the diverging portions 45 as shown at 47, and thus form means to limit the movements of the jaws to closed positions under the action of the spring 34 in its tendency to normally displace the operating head 36 upwardly. In this manner the operating head may be depressed against the action of the spring to depress the plunger or connecting member 35 and thus cause the jaws to be separated or wedged apart by the parting member or pin 46 in such a manner as to grasp the material to be held upon pressure on the operating head being released.

In the form of the invention shown in Fig. 5 of the drawings the plunger is indicated by the numeral 48 as being pivoted as shown at 49 to an extension 50 of one jaw 51 and this jaw is provided with a recess 52 at its inner edge. The other jaw is indicated by the numeral 53 and like the jaw 51 both are adapted to swing on the pivots 54, but the jaw 52 is provided with an extension 55 which fits in the socket or recess 52 in the nature of a ball and socket joint. As the recess is largest at its inner end and the extension correspondingly shaped to loosely fit the same, the parts must be connected by disposing the jaws face to face so that the extension will fit the recess or be displaced therefrom laterally and thereby held from accidental displacement when these parts are mounted in a handle such as heretofore described. It will thus be apparent that depression of the plunger 48 will cause the jaws to rock on their pivots simultaneously due to their connection with each other, while a spring such as described will cause the jaws to automatically close to a gripping position.

In Fig. 6 of the drawings the parts are the same as described in connection with Fig. 5 except that the jaws 51 and 53 are disposed in overlapped relation at their inner ends and formed with coacting arcuate slots 56 through which the pivot 57 connecting the plunger with the jaws is disposed. In this manner the slots will allow for the movements of the jaws on the pivots 54 upon the plunger being depressed to open the jaws while the latter will be automatically closed in the same manner as heretofore described. If desired or found preferable, the jaws 51 and 53 may be provided with elongated apertures or openings 58 to receive the pivots 54 therethrough to prevent binding engagement of the jaws at their inner ends in moving in opposed arcs on the pivots 54 as centers, but ordinarily this will be found unnecessary due to the slight movements of the inner ends of the jaws necessary to effect the opening and closing of their engaging ends.

A still further modification of the invention is shown in Figs. 7 to 9 in which the handle 59 is provided with an apertured stop member 60 about midway of the length thereof to form a seat for a spring 61, while secured in a transverse slot 62 in the lower end of the handle and secured to opposed plate portions thereof against movement, are a pair of bearing plates 63. These plates are connected by rivets or the like 64 forming pivots for a pair of jaws 65, and as shown, the upper ends of the jaws are enlarged and provided at their inner ends with a plurality, preferably three, rack teeth 66 arranged in convexly arcuate series and spaced apart with relation to each other. A double rack bar 67 fits between these rack teeth and is provided with opposed concavely arcuate series of teeth for engagement with the rack teeth 66, and is further formed with an enlargement 68 at its lower end to prevent displacement of the rack bar upwardly from between the rack teeth 66 at the inner and upper ends of the jaws. The upper end of the rack bar protrudes beyond the bearing plates 63 and is apertured for pivotal connection with a hook formed at the lower end of a plunger 69 which extends upwardly through the apertured stop 60, through the spring and is threaded at its upper end for engagement by an operating head 70. This operating head, like the others, may be of any approved ornamental design but in the present instance is intended to operate within the handle as distinguished from that form of the invention described in connection with and shown in Figs. 3 and 4 of the drawings. The jaws 65 in this instance are relatively flat and wide, this formation being effected by twisting the jaws at their shank portions and tortuously curving the same outwardly and then inwardly so as to bring the tapered extremities thereof in contact when the jaws are closed normally under the action of the spring. A pin or rivet 71 serves to anchor the bearing plates to the handle in the slot of the latter beyond the lower end of the rack bar so that for every degree of movement imparted to the plunger the jaws are correspondingly moved on their pivots to open and close. In order to provide for the more positive grasping of material between the jaws the latter are provided with transverse corrugations 72 on their inner faces near their free ends, the edges of the corrugations serving to grasp and positively hold a lump of sugar or the like.

In order to adapt the invention for holding or lifting and releasing powdered material, such as granulated or powdered sugar and the like, the jaws of either form of the invention are provided with opposed bucket sections or cups 73 which, as shown in Fig. 10, when the jaws are closed, are disposed in contact to form a receptacle open at its upper side so as to retain the material therein but such that when the jaws are open the edge portions 74 thereof are in position to readily enter the material without obstruction so as to pass into and permit the raising thereof to the limit of capacity of the device. By depressing the plunger the jaws may be open to separate the sections so as to free the material held therein. It will be further obvious that the shape and design of these sections may vary without departing from the spirit of the invention.

Having thus described my invention, what I claim as new and desire to secure by Letters Patent is:—

1. A device of the class described comprising a tubular handle, jaws fulcrumed on the lower end thereof, a compression spring within the handle, a doubled rod longitudinally movable in the handle and having its members engaging the respective jaws, a stop for the spring, and an operating button connected with the doubled extremity of the rod.

2. A device of the class described comprising a tubular handle, jaws separately pivoted thereon, a pair of members connected at their upper ends and slidable in the handle, with the lower ends engaging the jaws respectively, a pushbutton on the upper end of the members, a spring surrounding the members and bearing against the pushbutton, and a stop against which the spring bears, whereby the tension of the spring holds the jaws closed.

3. A device of the class described comprising a handle, and jaws composed of curved members pivotally connected with the handle and formed with free extremities constituting a receptacle open at its top and having a closed pointed bottom, said receptacle being divided in a central plane between the jaws, whereby the receptacle discharges its contents when the jaws are opened.

In testimony whereof I have signed my name to this specification in the presence of two subscribing witnesses.

AARON MENDELSON.

Witnesses:
 JOHN E. BURCH,
 PHILIP D. ROLLHAUS.

Copies of this patent may be obtained for five cents each, by addressing the "Commissioner of Patents, Washington, D. C."